Figure 1:
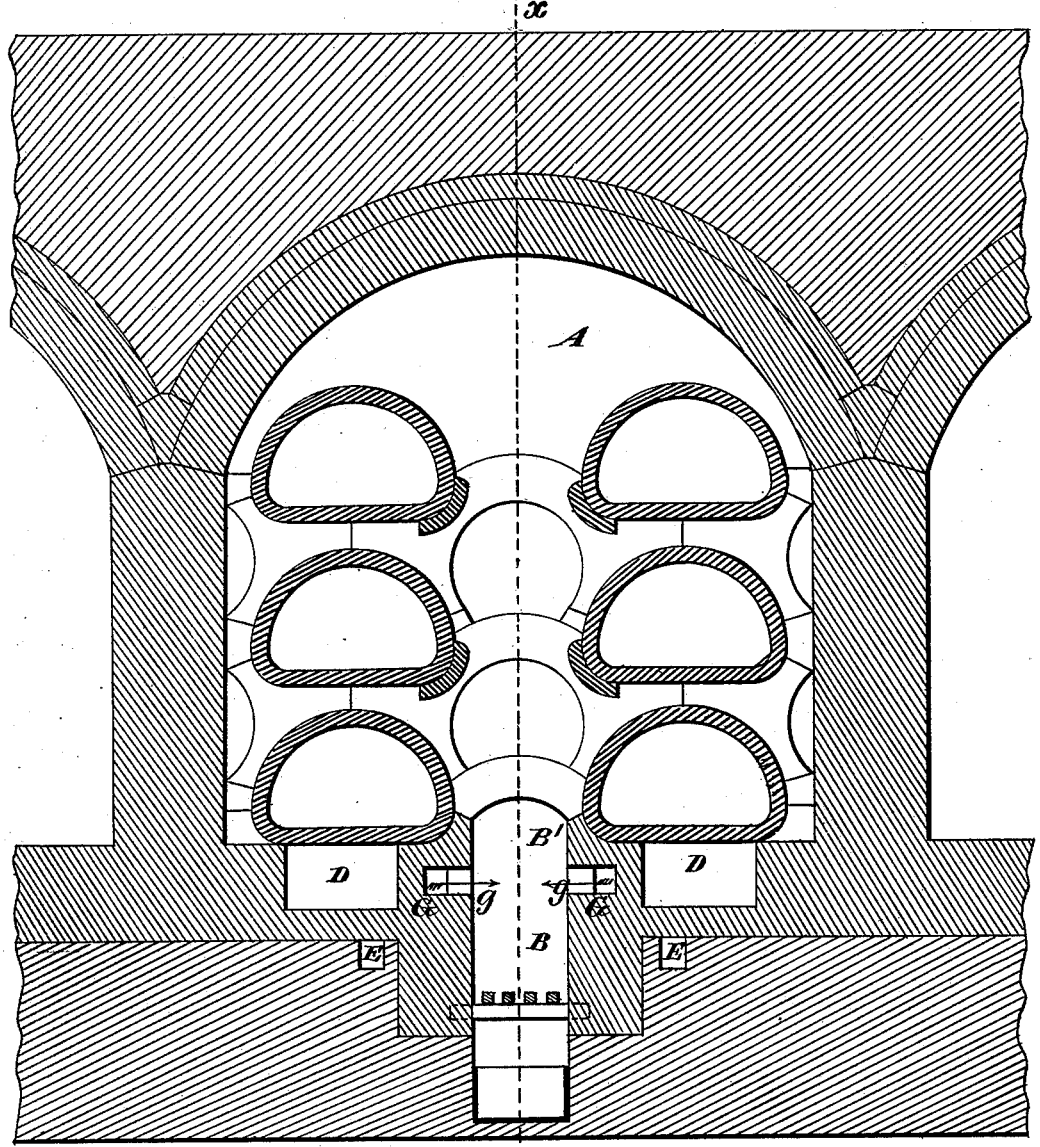

(No Model.)

2 Sheets—Sheet 1.

H. C. HANN.
GAS RETORT FURNACE.

No. 268,096. Patented Nov. 28, 1882.

Witnesses.
A. Ruppert.
A. L. Duffy.

Inventor:
Henry Clay Hann
per O. E. Duffy
Att'y (No Model.) 2 Sheets—Sheet 2.

H. C. HANN.
GAS RETORT FURNACE.

No. 268,096. Patented Nov. 28, 1882.

Witnesses. Inventor.

UNITED STATES PATENT OFFICE.

HENRY C. HANN, OF BALTIMORE, MARYLAND.

GAS-RETORT FURNACE.

SPECIFICATION forming part of Letters Patent No. 268,096, dated November 28, 1882.

Application filed September 8, 1882. (No model.)

*To all whom it may concern:*

Be it known that I, HENRY CLAY HANN, of Baltimore, in the county of Baltimore and State of Maryland, have invented certain new and useful Improvements in Gas-Retort Furnaces; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to gas-retort furnaces used in heating benches of retorts, in which coal or other gas-stock is distilled for the production of illuminating or other gas; and it is an improvement in that class of retort-furnaces in which air for supporting combustion in the fire-box and retort chamber or oven is preliminarily heated.

The object of the invention is to more thoroughly utilize the heat of the waste products of combustion and the valuable gases thereof than has heretofore been accomplished, and to produce a compact and effective furnace, which shall be comparatively cheap and simple in construction, for producing the desired results—viz., economy in fuel and satisfactory heating of the retorts.

In the retort-furnaces of ordinary construction there is an enormous waste of heat and fuel, due to the rapid circulation of the flame and hot products of combustion over the retorts to be heated through the retort-chamber and flues into the stack, where a great volume of flame and hot products escape without any effective work, and as the heating effect of the hot gases and flame is a very small per cent. of the heat-units of the fuel made effective for heating the retorts fuel is thus wasted and an unnecessary expense entailed in carrying on the manufacture of gas. Now, by my improved construction of furnaces and flues I provide for utilizing much of the unconsumed carbon and carbonic oxide of the escaping products by drawing them into suitable flues, mingling them with hot air, and causing their complete combustion in the fire-box; also for utilizing the heat of the waste gaseous outgoing products for heating the incoming air used for burning the above-mentioned carbonic oxide and free carbon, and for supporting combustion of coal in the fire-box. I am thus enabled to save and turn to effective work a great amount of heat that is ordinarily wasted.

To enable others skilled in the art to make and use my invention, I will proceed to describe its construction and operation.

Figure 2:
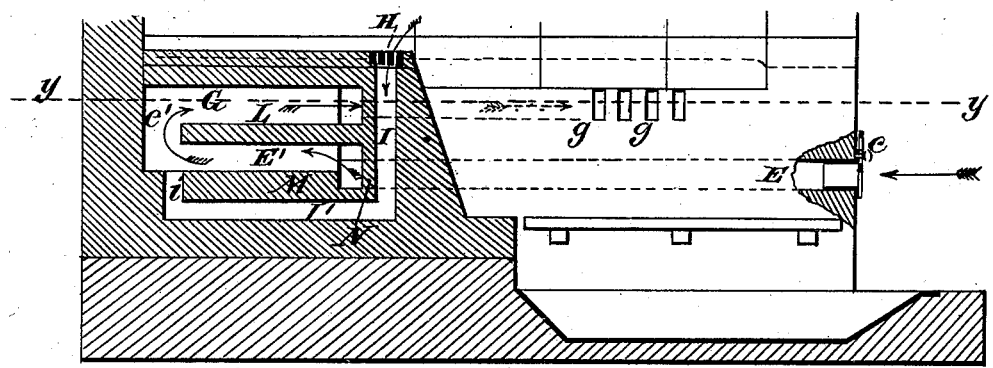
Figure 3:
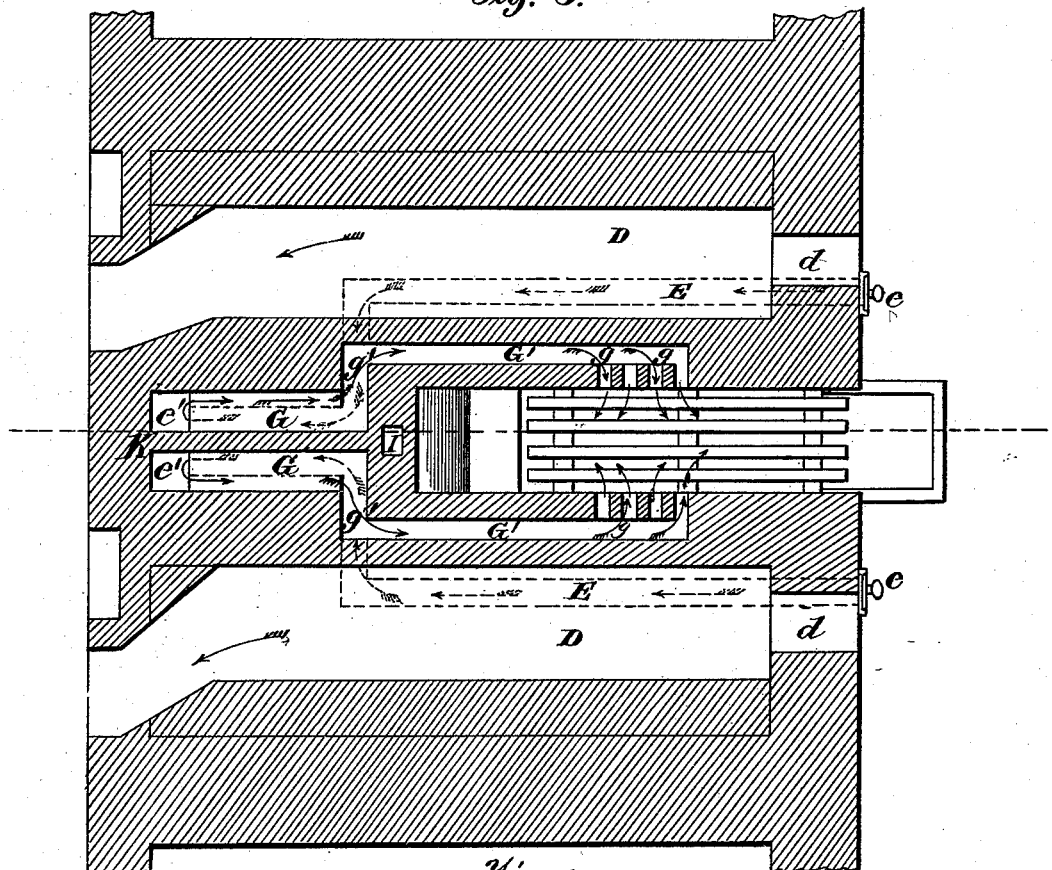
Figure 4:
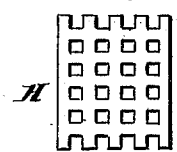

In the accompanying drawings, which form part of my specification, Figure 1 is a vertical transverse section of a retort-furnace and bench of retorts. Fig. 2 is a vertical longitudinal section through the fire-box and gas and air flues at the base of the retort-chamber. Fig. 3 is a horizontal section on the line *y y* through the fire-box and flues; and Fig. 4 is a top view, on an enlarged scale, of the grating placed at the entrance to the gas-flue.

The retorts are set in the usual arched chamber, A, and supported by suitable fire-clay blocks above and on either side of the fire-chamber B, which latter is provided with the usual grate and ash-pit. Below the lower retorts extend eduction-flues D, through which the products of combustion, after having circulated around the retorts, pass to the stack or uptake at the rear end of the bench. The escaping products are highly heated, and for the purpose of utilizing their heat and restoring it to the fire-chamber I provide the air-heating flues E, extending from the front of the furnace, just below the flues D, on each side of the fire-chamber, back to the labyrinth of regenerating-flues at the rear of the fire-chamber, where they turn at right angles, and by short transverse flues connect with the longitudinal flues E', below the gas and air mixing flues G. Short vertical passages connect the flues E' with the mixing-flues G. The course of flues E is clearly shown by dotted lines in Figs. 2 and 3, and the direction in which the air flows is indicated by the arrows. The entrance to each of the flues E is guarded by a sliding damper, *e*, for controlling the amount of air admitted. Openings *d* in the front wall, leading into the flues D, may be used in clearing the flues, and when not in use are closed by doors or plugs. At the rear of the fire-box a diving-flue, I, is provided, having its mouth protected by a grating, H. At its lower end it connects with the horizontal flue I', which connects by the short vertical passage $i$ with the air-flues E' on each side of the vertical partition K, and by the passage $e'$ with the mixing-flues G above the horizontal partition L. The vertical partition-wall N separates flue I from the flues E' G, and the horizontal partition M separates flue I' from the two flues E' above. The vertical longitudinal partition K separates the pair of flues G G and the pair of flues E' E', while the horizontal partition L separates the flues G from the flues E'. The mixing-flues G connect by short transverse flues $g'$, located above the air-flues, with the longitudinal side flues, G', and these latter open into the fire-box by numerous passages, $g$, in the side walls. These passages $g$ are shown as opening above the level to which the fuel would ordinarily rise in the fire-box; but they may be extended lower down, so as to open below the top of the fuel. The flues are built in the brick foundation of the furnaces, and are, in addition, formed by the vertical and horizontal fire-clay partitions K, L, M, and N, above mentioned. The grating H, covering the diving-flue I, is formed of fire-clay or other refractory material.

By the draft in the furnace air is drawn in through the side flues, E, and gas containing unconsumed carbonic oxide and carbon is drawn down the diving-flue I, and both are drawn onto the commingling-flue G, where, if they are sufficiently heated, combustion takes place, the highly-heated products passing to the fire-box and yielding their heat to the retorts. Should they not be sufficiently highly heated for immediate combustion, they simply mingle and pass to the fire-box, where the gas and carbon are burned. The mingled air and gas, or the hot carbonic acid resulting from their combustion, may be passed from the flues G' into the fire-box directly into the incandescent fuel, and by passage up through such fuel be reduced to carbonic oxide, which, by a suitable air-supply, is burned above the fuel. Even if carbonic acid only were drawn into the diving-flue, it would impart its heat to the incoming air, and by passage through the fuel in the fire-box would be reduced to carbonic oxide, which possesses valuable heating qualities, and would be burned above the fuel with an advantageous economy in heat. It is thus seen that the air is heated by the heat imparted to it through the walls of the flues from the waste outgoing hot products, and by the heat of the gases mingled directly with it in the mixing-flues, and that gases containing valuable heating constituents are restored to the fire-box and there fully utilized.

Having thus described my invention, what I claim, and wish to secure by Letters Patent, is—

1. A gas-retort furnace consisting of a fire-box and retort-chamber having a flue for returning a part of the products of combustion to the fire-box, said flue being connected at one end with the fire-box, at or near the center of the bridge-wall, and at the other end, by proper connecting-passages, with the fire-box above the grate.

2. A gas-retort furnace consisting of a fire-box and retort-chamber, the fire-box having a flue for the escape of the products of combustion on each side of the same, an air-flue under each of said escape-flues, a return gas-flue connected with the fire-chamber back of the bridge-wall, a mixing-flue connected with both of the air-flues and with the return gas-flue, and flues connecting said mixing-flue with the fire-box above the grate.

3. A gas-retort furnace provided with flues D for the escape of waste products, the contiguous air-heating flues, E, and connected flue E', the diving gas-flue I, the connected flue I', extending below the air-flue E', and the connecting air and gas mixing flues G G', having passage $g$ leading into the fire-box.

4. A gas retort furnace provided with a regenerative gas and air flue structure consisting of the foundation brick-work having flues D and E, the transverse vertical partition N, the horizontal partitions L and M, and the intersecting vertical partition K, having suitable connecting-passages, and constructed as described, for the purpose set forth.

In testimony that I claim the foregoing as my own I affix my signature in presence of two witnesses.

HENRY CLAY HANN.

Witnesses:
  M. P. CALLAN,
  G. W. DOOLITTLE.